UNITED STATES PATENT OFFICE.

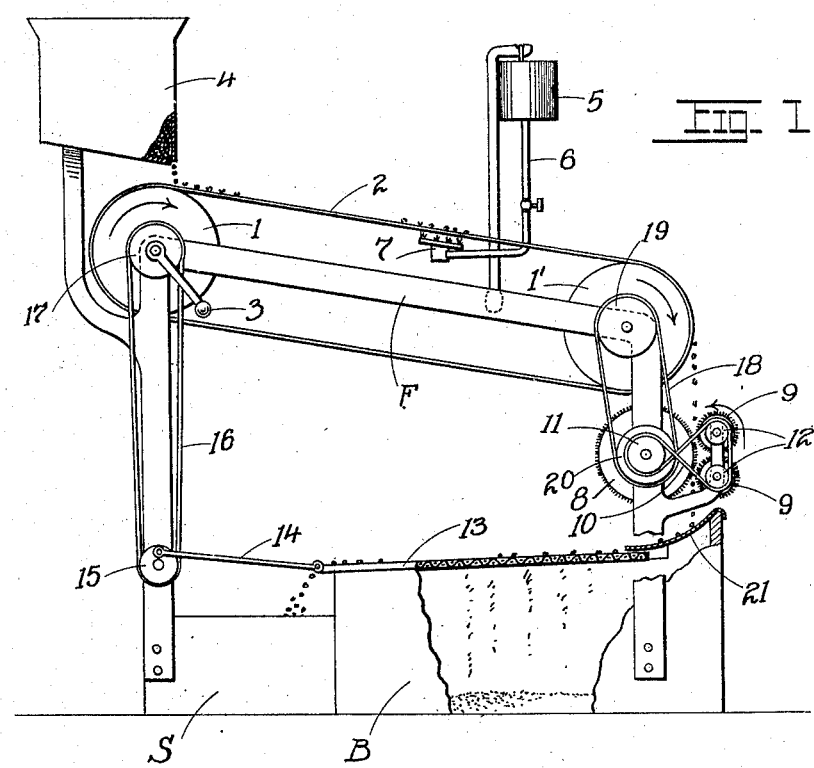
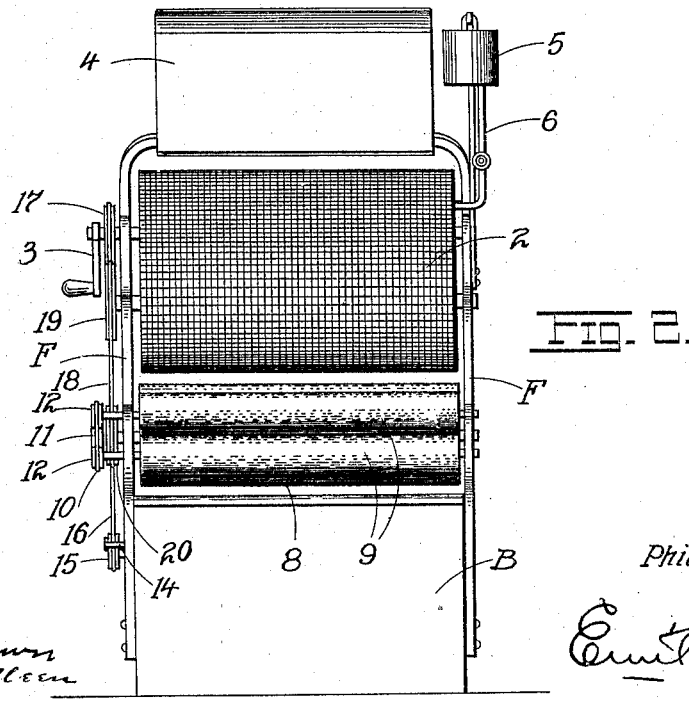

PHILO T. ROOD, OF ST. LOUIS, MISSOURI.

APPARATUS FOR CLEANING COTTON-SEED.

No. 822,478.        Specification of Letters Patent.        Patented June 5, 1906.

Application filed September 8, 1905. Serial No. 277,535.

*To all whom it may concern:*

Be it known that I, PHILO T. ROOD, a citizen of the United States, residing at St. Louis, State of Missouri, have invented certain new and useful Improvements in Apparatus for Cleaning Cotton-Seed, of which the following is a full, clear, and exact description, reference being had to the accompanying drawings, forming a part hereof.

My invention has relation to improvements in apparatus for cleaning cotton-seed; and it consists in the novel construction and arrangements of parts more fully set forth in the specification and pointed out in the claims.

In the drawings, Figure 1 is a side elevation of the apparatus, and Fig. 2 is a front elevation thereof.

The object of my invention is to construct an apparatus which will effectively remove the lint adhering to the seed after the ginning operation, which lint causes the seeds to adhere so that they cannot ordinarily be planted singly as other seeds, like corn and the like. By my apparatus this lint is removed, so that the seed may be placed in a planter using a cut-off plate, which permits the seeds to drop and be planted singly. In detail the apparatus may be described as follows:

Referring to the drawings, F represents a suitable frame on the inclined top of which are mounted drums 1 1', over which passes a conveyer-belt 2 of wire or non-inflammable material, the belt being advanced in the direction shown by the arrow, Fig. 1, by a crank-arm 3, the inclination of the upper lap of the belt conveying the seed deposited thereon from the hoppper 4 toward the lower end of the belt. Mounted above the belt is a gasolene-tank 5, from which leads a tube 6, terminating in a burner 7 underneath the upper lap of the belt; the frame of the burner singeing the lint adhering to the seeds. The seeds then drop and pass between the brush-cylinders 8 9 9, to which rotation in proper direction is imparted by the cross-belt 10, passing over pulleys 11 12 12. The lint is thus further brushed from the seed, after which the seeds drop onto a reciprocating sieve 13, to which motion is imparted by a connecting-rod 14, coupled eccentrically to a pulley 15, from which passes a belt 16 to a pulley 17 on the shaft of the drum 1. The dust and lint is caught in the box B and the cleansed seed in a seedbox S. The brush 8 is rotated by a belt 18, passing, respectively, over pulleys 19 and 20. The seed is directed onto the sieve 13 by a plate 21.

Having described my invention, what I claim is—

1. In a cotton-seed-cleaning apparatus, a suitable hopper, brush-cylinders for the seed, a belt conveyer having an upper inclined lap interposed between the hopper and cylinders, means for singeing the seed in its passage over the conveyer and means for sifting the same after treatment by the brushes, substantially as set forth.

2. A cotton-seed-cleaning apparatus comprising a hopper, brush-cylinders for the seed, a belt conveyer having an upper inclined lap interposed between the hopper and cylinders, means for singeing the lint in the passage of the seed over the conveyer, a sieve for sifting the seed upon its discharge from the brush-cylinders, and suitable receptacles for the cleaned seed and the dust and lint, respectively, substantially as set forth.

In testimony whereof I affix my signature in presence of two witnesses.

PHILO T. ROOD.

Witnesses:
     W. J. BARTLING,
     HY. G. OHEIM.